(No Model.)

H. G. GILBERT.
NUTMEG GRATER.

No. 484,880. Patented Oct. 25, 1892.

Witnesses
Jos H Blackwood
Albert B Blackwood

Inventor
Henry Graves Gilbert.
By his Attorney

UNITED STATES PATENT OFFICE.

HENRY GRAVES GILBERT, OF DAYTON, OHIO.

NUTMEG-GRATER.

SPECIFICATION forming part of Letters Patent No. 484,880, dated October 25, 1892.

Application filed March 11, 1892. Serial No. 424,489. (No model.)

*To all whom it may concern:*

Be it known that I, HENRY GRAVES GILBERT, a citizen of the United States, residing at the city of Dayton, and State of Ohio, have invented certain new and useful Improvements in Nutmeg-Graters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to that class of graters in which a rough indented surface is made to rub off small particles of roots, herbs, and nuts, and is especially adapted to grate nutmegs. In my grater a dished disk provided on its face with different-sized holes to receive the nuts, having a spindle, together with a disk to fit the dish to complete the shell, provided on its inner side with a rough indented surface and handle to turn it on the spindle, and an opening beneath complete the grater.

The object of my invention is to secure a neat, cheap, and convenient grater for use in the family. I attain this object by the mechanism shown by the accompanying drawings, in which—

Figure 1:
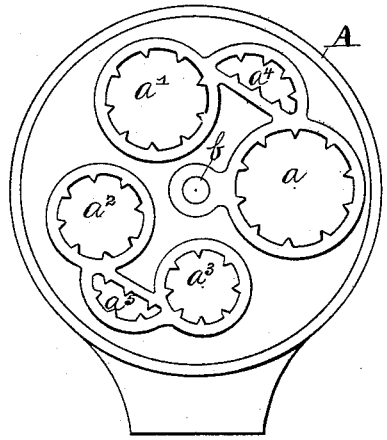
Figure 2:
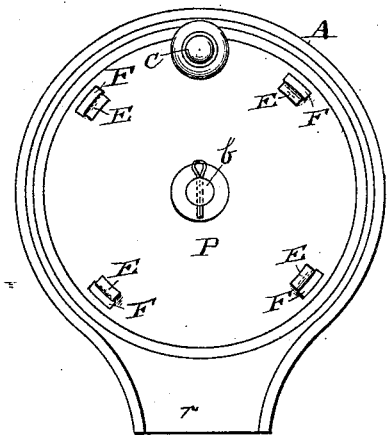
Figure 3:
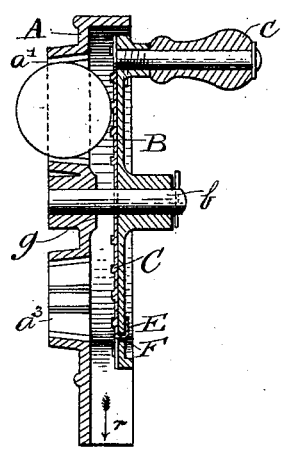
Figure 4:
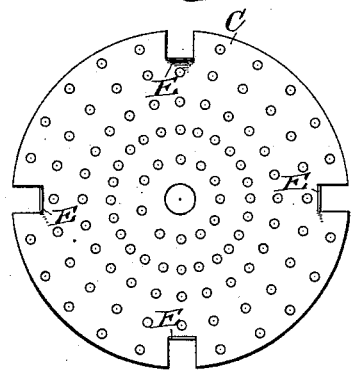

Figure 1 is a side elevation. Fig. 2 is an opposite side elevation. Fig. 3 is a central vertical section. Fig. 4 is a plan view of the grater-disk.

Similar letters refer to similar parts throughout the several views.

In the drawings, the letter A represents a disk dished to form a part of the shell of the grater and having an exit $r$ beneath. It is further provided on its face with different-sized holes $a$, $a'$, $a^2$, $a^3$, $a^4$, and $a^5$, slightly tapered from the inside of the shell and having jagged edges to better hold the nut in position while being ground. Extending laterally from the center of disk A is spindle $b$, on which disk B, hereinafter described, turns.

B is a metal disk fitted to close up the dish of disk A and to revolve within it on spindle $b$ by handle $c$, and completes the shell of the grater.

C represents a sheet-metal disk punctured to form a rough indented surface within the grater and cut around its circumference to form lips E E E E to fit into holes F F F F in disk B, which by bending attach and hold disk C to disk B and revolves with it.

It will be seen that disk A within the shell around spindle $b$ is provided with shoulder $g$ to keep disks A and B from touching each other in grinding.

The operation of my grater is as follows: The grinding-disk is removed from the spindle and the nut is pressed against the jags in a proper-sized hole from the inside of the shell and is ground until the disks come together in the center, the grindings falling in the direction of the arrow into a proper receptacle, when the grinding-disk is removed and the operation repeated until the nut is ground, each time being placed in a smaller hole.

Having sufficiently described my invention, what I claim, and desire to secure by Letters Patent, is—

1. The combination, with portion A, having a spindle $b$ and different-sized tapering toothed sockets for holding nutmegs, of rotating disk B, provided with a handle on the outer surface and a grinding-disk C on the inner surface, as set forth.

2. The combination, with dished disk A, having spindle $b$, shoulder $g$, exit $r$, and tapering toothed sockets for holding nutmegs, of disk B, having handle $c$ and openings F and provided underneath with grating-disk C, having fastening-clips E, as set forth.

H. GRAVES GILBERT.

Witnesses:
A. E. FINCH,
W. W. SWAIN.